(12) United States Patent
Carrender et al.

(10) Patent No.: US 7,619,531 B2
(45) Date of Patent: Nov. 17, 2009

(54) RADIO FREQUENCY IDENTIFICATION WITH A SLOT ANTENNA

(75) Inventors: Curtis L. Carrender, Morgan Hill, CA (US); Robert Martin, San Jose, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 446 days.

(21) Appl. No.: 11/489,149

(22) Filed: Jul. 18, 2006

(65) Prior Publication Data

US 2007/0017986 A1    Jan. 25, 2007

Related U.S. Application Data

(60) Provisional application No. 60/700,851, filed on Jul. 19, 2005.

(51) Int. Cl.
*G08B 13/14* (2006.01)

(52) U.S. Cl. ............... 340/572.7; 340/572.1; 340/505; 340/10.1; 340/539.1

(58) Field of Classification Search .............. 340/572.1, 340/505, 10.1, 539.1, 539.23, 572.2, 572.7, 340/572.8
See application file for complete search history.

(56) References Cited

U.S. PATENT DOCUMENTS

| | | | |
|---|---|---|---|
| 6,628,237 B1 | 9/2003 | Forster et al. | |
| 6,642,897 B2 | 11/2003 | Forster et al. | |
| 6,816,380 B2 | 11/2004 | Credelle et al. | |
| 6,864,570 B2 | 3/2005 | Smith | |
| 2006/0255948 A1* | 11/2006 | Runyon et al. | 340/572.7 |
| 2006/0255949 A1* | 11/2006 | Roeder et al. | 340/572.7 |

* cited by examiner

*Primary Examiner*—Daryl Pope
(74) *Attorney, Agent, or Firm*—Blakely, Sokoloff, Taylor & Zafman LLP

(57) ABSTRACT

Techniques for a radio frequency identification (RFID) device are provided. The device includes a slot antenna having at least one slot disposed in a first substrate. A strap is disposed across the slot. The strap includes a second substrate and an integrated circuit. The integrated circuit is electrically coupled to the slot antenna. In a specific embodiment, a thickness of a metal slot antenna is at least $\frac{1}{4}^{th}$ an inch. The RFID device can also be associated with a location, and be attached to a pallet rack.

36 Claims, 8 Drawing Sheets

RADIO FREQUENCY IDENTIFICATION WITH A SLOT ANTENNA

The present application claims priority to U.S. Provisional Patent Application No. 60/700,851 filed on Jul. 19, 2005, and entitled "Techniques for Radio Frequency Identification with a Slot Antenna", which is incorporated herein by reference in its entirety; this application claims the benefit of the provisional application's filing date under 35 U.S.C. § 119(e). The present application hereby claims the benefit of this earlier filing date under 35 U.S.C. § 120.

BACKGROUND OF THE INVENTION

1. Field of the Invention

The present invention generally relates to the field of radio frequency identification (RFID). More particularly, the present invention relates to RFID devices and readers.

2. Description of the Related Art

Goods and other items may be tracked and identified using a radio frequency identification (RFID) system. A conventional RFID system 100 is illustrated in FIG. 1. RFID system 100 includes at least one tag 106, which is typically placed on an item 112 to be tracked. RFID tag 106 is a small transponder that can be read by an RFID reader 102 (also referred to as an RFID interrogator). Reader 102 includes a transceiver and an antenna 104. The antenna 104 emits electromagnetic (EM) waves generated by the transceiver, which, when received by tag 106, activate the tag 106. Once tag 106 has been activated, it communicates using radio waves back to reader 102, thereby identifying item 112 to which tag 106 is attached.

There are three basic types of RFID tags. A beam-powered tag is a passive device which receives energy required for operation from the EM waves generated by the reader. The beam powered tag rectifies an EM field and creates a change in reflectivity of the field which is reflected to and read by the reader. This is commonly referred to as continuous wave backscattering. A battery-powered semi-passive tag also receives and reflects EM waves from the reader. However, the battery powered tag includes a battery to power the tag independent of receiving power from the reader. An active tag actively transmits EM waves which are then received by the reader.

Applications of RFID systems typically involve inexpensive and disposable tags. Thus, high volume manufacturing methods and systems are used to produce conventional tags. Antennas for such tags are often screen printed on tape or flexible web material. As to be expected, conventional tags are not suitable for extended use in harsh environments. For example, in a warehouse environment, exposed tags are often damaged by impacts with pallets, forklifts, and other heavy equipments, resulting in inoperability of the tag. In fact, in these environments, reader antennas are sometimes damaged as well.

From the above it is seen that techniques for durable RFID devices are desired.

BRIEF SUMMARY OF THE DESCRIPTION

Methods and apparatuses for radio frequency identification (RFID) devices are described. In one embodiment of the present invention, an RFID device includes a slot antenna having at least one slot disposed in a first substrate. A strap disposed across the slot is electrically coupled to the slot antenna. The strap includes a second substrate and integrated circuit. In a certain embodiment, the first substrate is metal, thereby making the slot antenna (as well as the RFID device) substantially more durable than a conventional antenna (or tag).

In another embodiment of the present invention, an RFID device includes a slot antenna having a slot disposed in a first substrate. The slot has a predetermined length in a first direction. A strap is disposed across the slot in a second direction. The strap includes a second substrate, integrated circuit, and at least two feedlines. The feedlines electrically couple the integrated circuit to the slot antenna. In certain embodiments, the feedlines couple to the first substrate on opposite sides of the slot. In some cases, the directions of the slot and the strap are substantially orthogonal to each other.

In yet another embodiment of the present invention, a pallet rack includes at least one shelf and at least one RFID device associated with the pallet rack. The RFID device includes a first substrate and a slot of predetermined length and/or width disposed in the first substrate. A second substrate is disposed across the slot. An integrated circuit is coupled to the second substrate and to at least two contact pads. These contact pads electrically couple the integrated circuit to the first substrate.

In another embodiment of the present invention, an RFID reader includes at least one slot antenna. The at least one slot antenna is configured to receive a radio signal within a predetermined frequency range. In a certain embodiment, the operational frequency comprises the range between 860 MHz and 960 MHz. A transceiver is electrically coupled to the slot antenna, and a processor coupled to the transceiver. According to an embodiment, a metal slot antenna has a thickness of at least $1/4^{th}$ an inch, and it protects the transceiver or processor from physical damage.

An embodiment of the present invention includes a method for storing pallets. The method includes providing a pallet rack with at least one tag coupled thereto. Location information stored in the at least one tag is read and compared to a predetermined location. If the location information identifies the predetermined location, then a pallet is removed from, or placed in, the pallet rack.

Therefore, as summarized herein, the present invention provides, among other things, methods and apparatuses for radio frequency identification (RFID), and in particular, RFID devices and readers with a slot antenna. Various additional objects, features, and advantages of the present invention can be more fully appreciated with reference to the detailed description and accompanying drawings that follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The present invention will now be described more fully hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Likewise, for purposes of explanation, numerous specific details are set forth in the following description in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. References to one or an embodiment in the present disclosure are not necessarily references to the same embodiment; and, such references mean at least one. Furthermore, various methods may be described in the following as multiple discrete operations in turn in a manner that is most helpful in understanding embodiments of the present invention. However, the order of the description should not be construed as to imply that these operations are necessarily to be performed in any particular order, in particular, in the order of the presentation.

Figure 1:
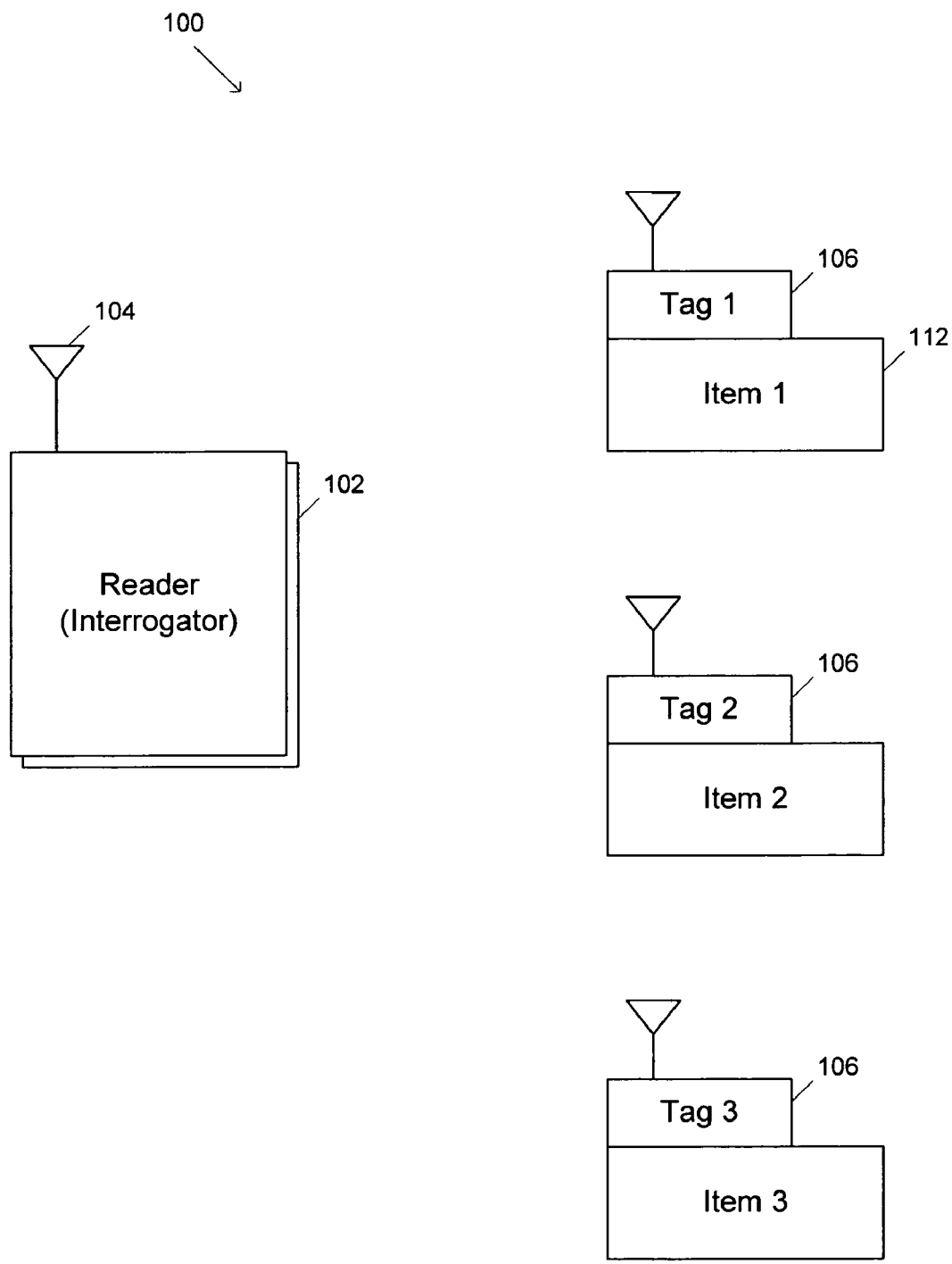
FIG. 1 shows an example of a conventional radio frequency identification (RFID) system.
Figure 2:
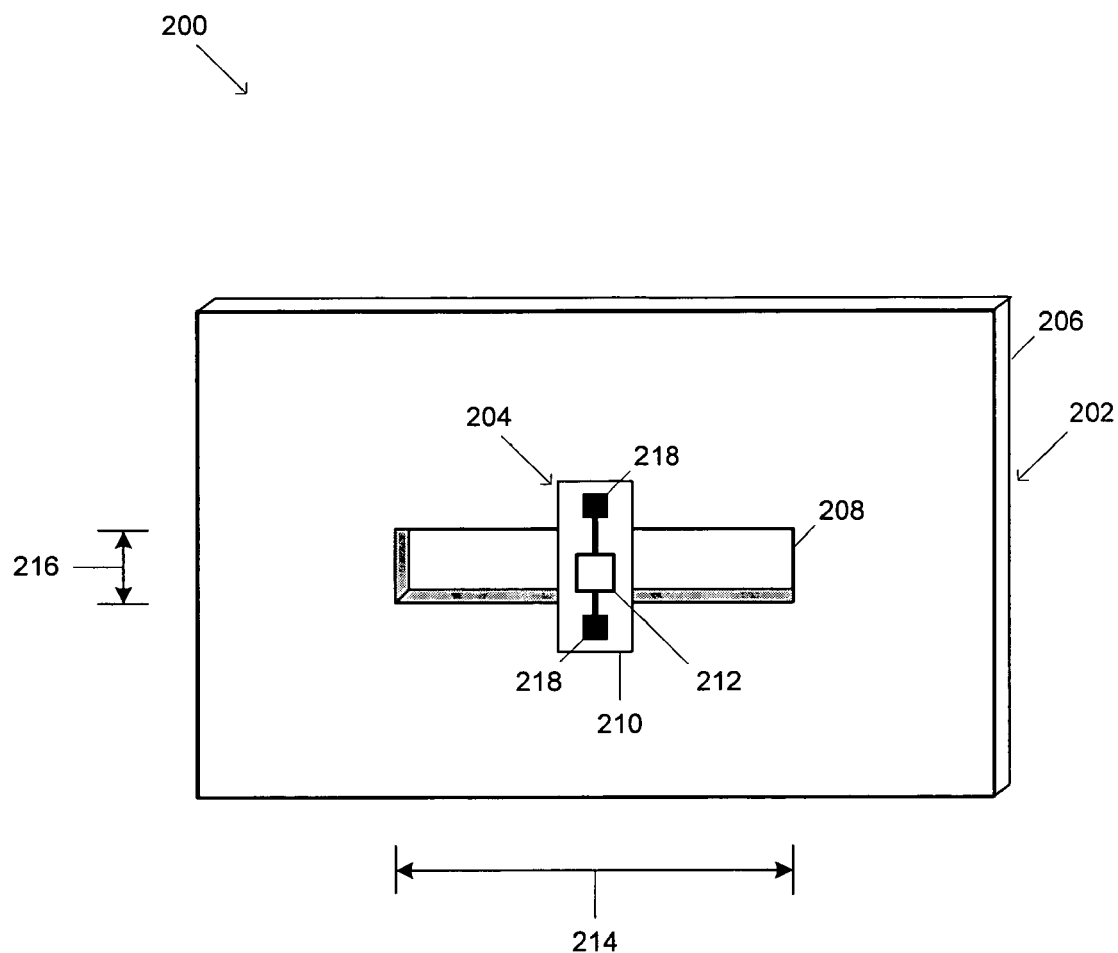
FIG. 2 illustrates an exemplary RFID tag according to an embodiment of the present invention.

FIG. 2 shows a back view of tag 200 according to an embodiment of the present invention. Radio frequency identification (RFID) tag 200 includes a slot antenna 202 and strap 204. In this example, slot antenna 202 is a conductive, substantially planar substrate 206 with a slot 208 therein. Substrate 206 can be comprised of metal, stainless steel, steel, aluminum, copper, titanium, iron, brass, bronze, conducting ceramics, or the like. Slot 208, an opening in substrate 206, electrically couples to strap 204 and acts as an effective antenna. That is to say, reader interrogation signals transmitted to tag 200 are received by strap 204 via slot 208. Similarly, modulated interrogation signals can be reflected or backscattered from tag 200 by way of slot 208.

Strap 204 includes a substrate 210, integrated circuit (IC) 212, and at least two feedlines 218 (or otherwise at least two strap contact pads). Substrate 210 provides support for integrated circuit 212 and the feedlines. It can be flexible or rigid, and monolayer or multilayer. For example, substrate 210 can be a plastic monolayer base film. In one embodiment, substrate 210 is a thermoplastic base film and has a glass transition temperature ($T_g$) of at least about 100° C., more optimally at least about 125° C., and even more optimally at least about 145° C.-150° C. Examples of suitable materials that can be used for the substrate 210 include, but are not limited to, polyethylene, polystyrene, polypropylene, polynorbornene, polycarbonate, liquid crystal polymer, polysulfone, polyetherimide, polyamide, polyethyleneterephthalate, and polyethylenenaphthalate, and derivatives thereof. In alternative embodiments, when substrate 210 comprises multiple layers, layers can provide one or more of dimensional stability, mechanical strength, dielectric properties, desired thickness, recessed regions for fluidic self-assembly (FSA) processing, as described below, and other functionalities. For example, substrate 210 can include a metal foil layer (e.g., aluminum) for dimensional stability.

IC 212 implements the command protocol and can contain an EPC (Electronic Product Code) and/or other information. In one embodiment, IC 212 is a NanoBlock™ IC made by Alien Technology Corporation of Morgan Hill, Calif. Strap 204 may be fabricated through a fluidic self-assembly (FSA) process. For example, IC 212 may be fabricated with a plurality of other integrated circuits in a semiconductor wafer. IC 212 can include the necessary logic of a particular RFID tag, excluding an antenna. IC 212 may be programmed with a unique identification code and then singulated (and shaped) from the wafer. IC blocks are next suspended in a fluid. The fluid is dispersed over a substrate (alternatively, a substrate web for a roll-to-roll process), such as a flexible substrate 210, to create separate straps. Receptor regions in the substrate would receive at least one IC, which then can be electrically coupled to an antenna. An example of fluidic self-assembly is described in U.S. Pat. No. 6,864,570, entitled "Method for fabricating self-assembling microstructures," which is incorporated by reference herein.

Feedlines 218 electrically couple IC 212 to the slot antenna 202. In a specific embodiment, contact pads of IC 212 are coupled to each side of slot 208 via these feedlines. Feedlines 218 can be conductive layers of strap 204 connected to contact pads of IC 212 by contact vias, or holes through an intervening dielectric layer.

In alternative embodiments, a conventional strap can be used in lieu of strap 204. Examples of straps are described in U.S. Pat. No. 6,816,380, entitled Electronic Devices with Small Functional Elements Supported on a Carrier," and U.S. patent application Ser. No. 10/056,192, entitled "Apparatus Incorporating Small-Feature-Size and Large-Feature-Size Components and Method for Making Same," both of which are incorporated herein by reference. In certain alternative embodiments, the IC can be attached to the strap in a "flip chip" manner in which the contact pads on the IC face contact pads on a flat substrate (with no hole for the IC).

The dimensions of substrate 206, such as length, width, and thickness, will vary for particular applications. For example, the thickness of substrate 206 can be at least $¼^{th}$ an inch of metal to physically protect strap 204 in an embodiment of the present invention. The dimensions for slot 208 can designed for a particular application as well. Preferably, slot 208 is designed or tuned for an appropriate operational frequency range. For an operational frequency range of 860 MHz to 960 MHz, a length 214 of slot 208 can be from about 2 inches to about 4 inches, and a width 216 can be from about $⅛^{th}$ an inch to about ½ an inch. Alternatively, length 214 and width 216 are at least about 20% and at least about 5% of the expected wavelength, respectively. In some embodiments of the present invention, the slot dimension is determined based on a certain wavelength of the operational frequency range to optimize the performance. Although slot 208 is shown to be a rectangle in FIG. 2, it can take other shapes. For example, a slot can be shaped as a polygon or an elongated oval, or any other shapes suitable for particular applications.

Referring again to FIG. 2, strap 204 is roughly orthogonal to length 214, or the major axis of slot 208. Strap 204 is also disposed at about the middle of length 214. In alternative embodiments, strap 204 can be disposed at any angle, or skew, with respect to slot 208. For example, strap 204 can have an orientation that ranges from about 30 degrees to about 150 degrees with respect to the major axis of slot 208 (i.e., ±60 degrees from perpendicular), or more preferably 60 degrees to about 120 degrees with respect to the major axis of slot 208. Also, strap 204 can be placed at any arbitrary position along length 214, albeit with potentially reduced or asymmetrical performance.

In an alternative embodiment, slot antenna 202 can be used with a conventional tag. An antenna (such as monopole, dipole, and double dipole antennas) of a conventional tag is electrically coupled to slot antenna 202. The electrical coupling can be by direct contact or capacitively through one or more layers of dielectric film.

Figure 3:
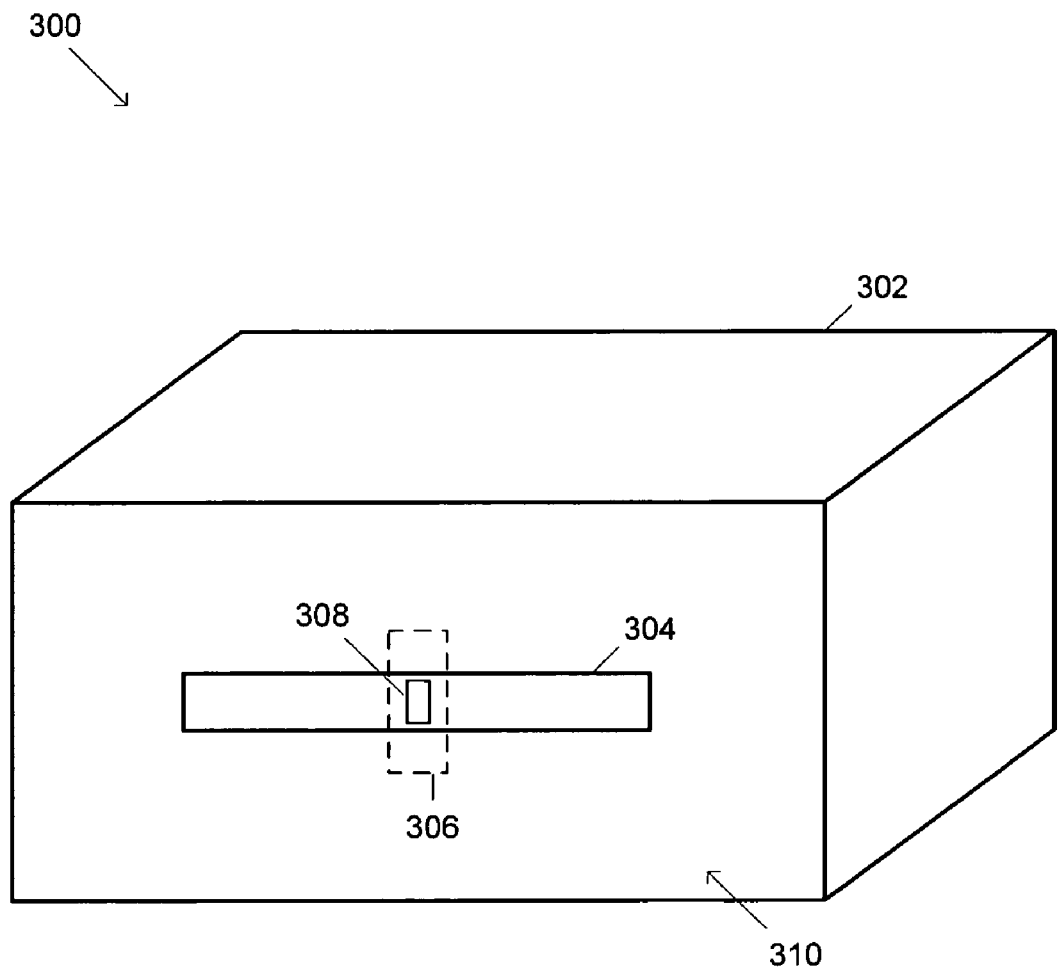
FIG. 3 illustrates another exemplary RFID tag according to an embodiment of the present invention.

FIG. 3 shows a tag 300 according to another embodiment of the present invention. A slot antenna for tag 300 is implemented by structure 302 and slot 304. Strap 306, containing an IC 308, is disposed across slot 304. The surfaces of structure 302 are metal and, other than slot 304, entirely enclose strap 306. Thus, structure 302 can be a protective container. In alternative embodiments, surfaces of structure 302 (other surface 310) need not be conductive. In fact, these surfaces can be entirely open. In yet another embodiment, a conventional RFID tag (including an antenna) can be used in lieu of strap 306.

It should be noted that tag 300 may provide a practical advantage over tag 200 under certain circumstances. In free space, tags 200 and 300 will have comparable RF performance. However, RF performance for tag 200 could be adversely affected when attached to an item. In other words, the attached item may alter the antenna properties of tag 200. Tag 300 can be attached to an item without significantly altering its antenna properties.

Figure 4:
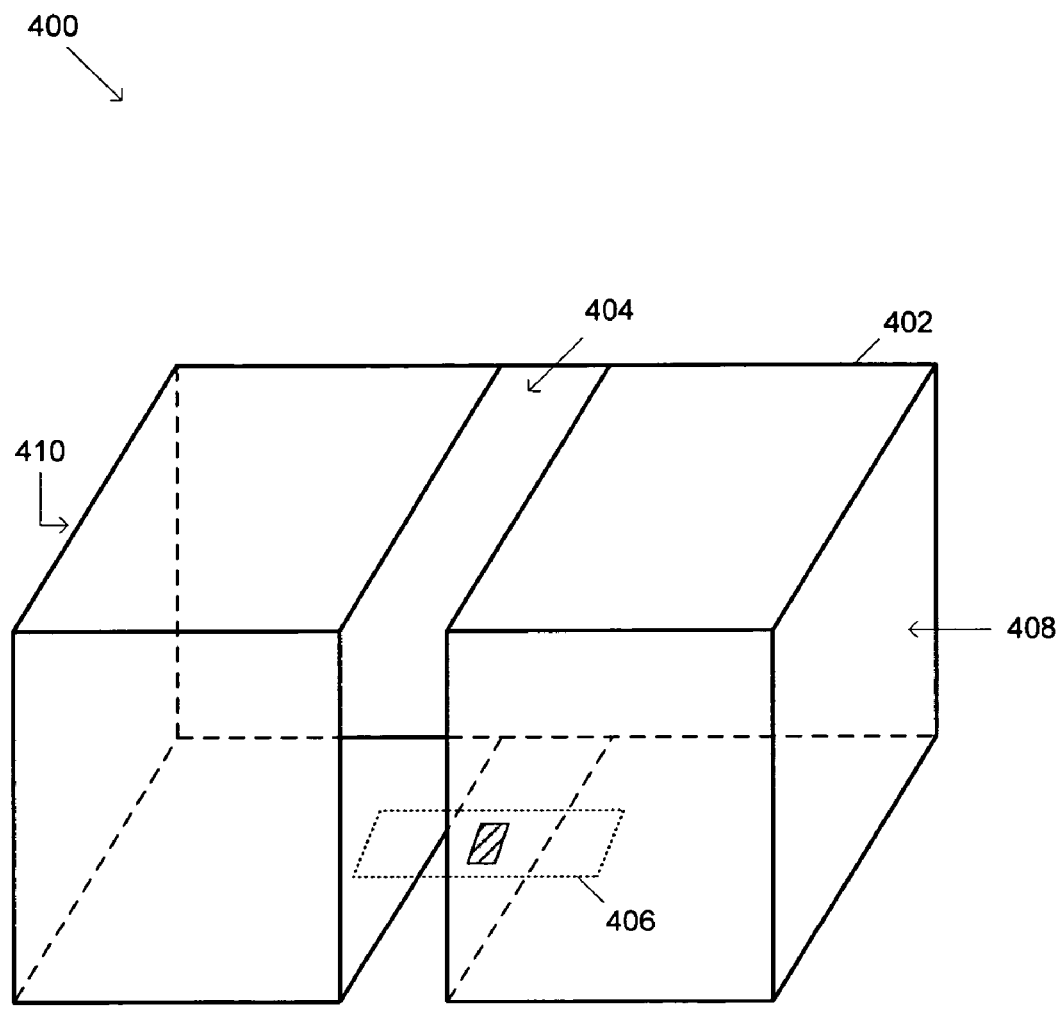
FIG. 4 illustrates another exemplary RFID tag according to an embodiment of the present invention.

FIG. 4 illustrates an exemplary RFID tag 400 according to an embodiment of the present invention. A slot antenna is implemented with structure 402 and slot 404. Slot 404 extends across three sides of structure 402. Strap 406 extends across slot 404 and is electrically coupled to the slot antenna. For ease of manufacturing, surfaces at proximal end 408 and distal end 410 can be open. Thus, structure 402 can be formed from an extruded square metal tube.

As an alternative embodiment, slot 404 can extend over one, two, or even four sides of structure 402. If slot 404 extends over four sides, the two halves of structure 402 can be either (i) mounted in fixed positions relative to each other (the distance between the halves defining the width of slot 404), or (ii) coupled together, for example, by a support beam.

Figure 5:
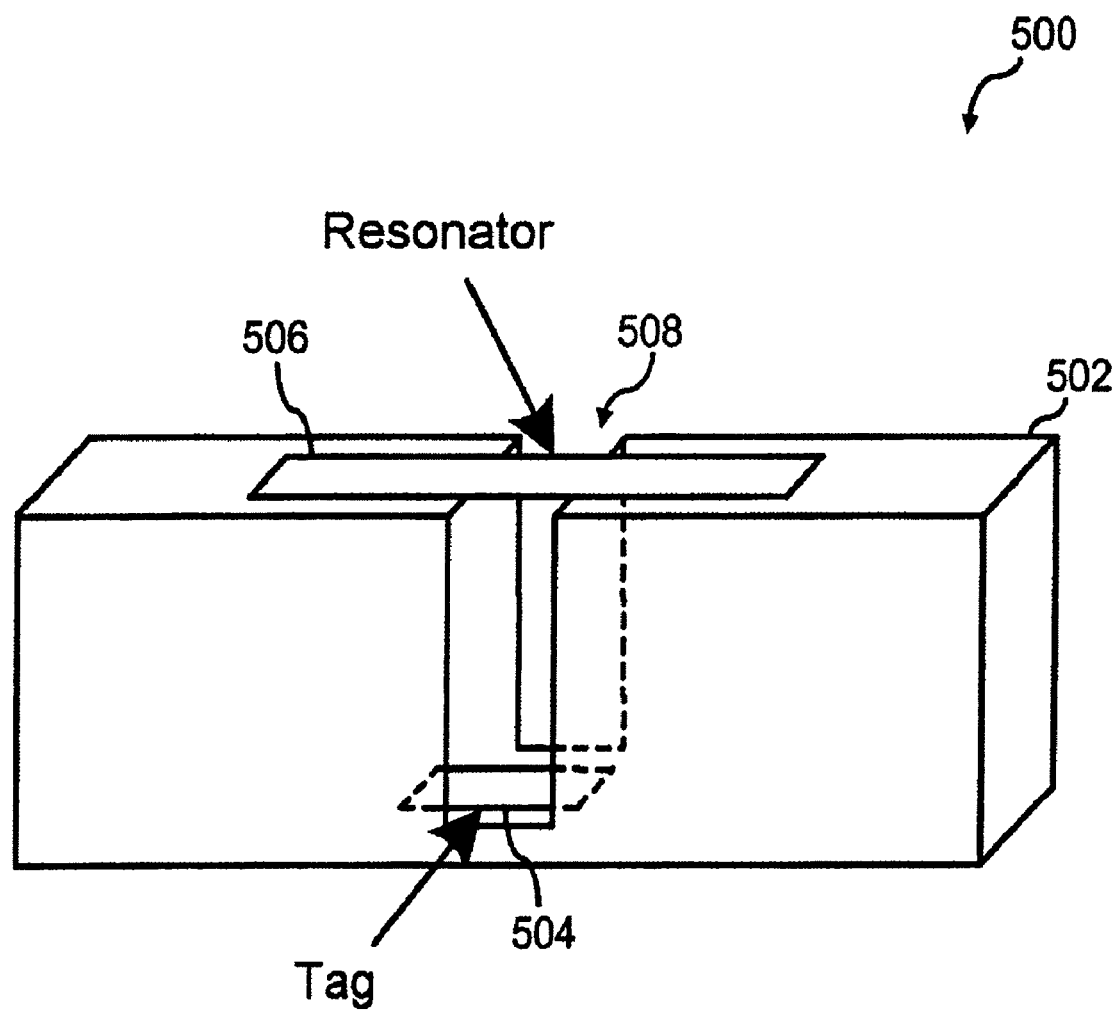
FIG. 5 illustrates another exemplary RFID tag according to an embodiment of the present invention.

As shown in FIG. 5, a device 500 is another embodiment of the present invention. The exemplary RFID device 500 includes a structure 502, tag 504, and resonator 506. Structure 502 can be made from any conductive material, including those materials described above, and it forms slot 508. Resonator 506, e.g., a metallic overlay spaced from the slot opening by a low dielectric constant spacer, directs radio frequency (RF) signals into slot 508 and towards tag 504. Tag 504 is disposed away from resonator 506 by at least about 5% of the expected wavelength. In one embodiment, tag 504 is a conventional tag including at least an RFID integrated circuit and an antenna.

Figure 6:
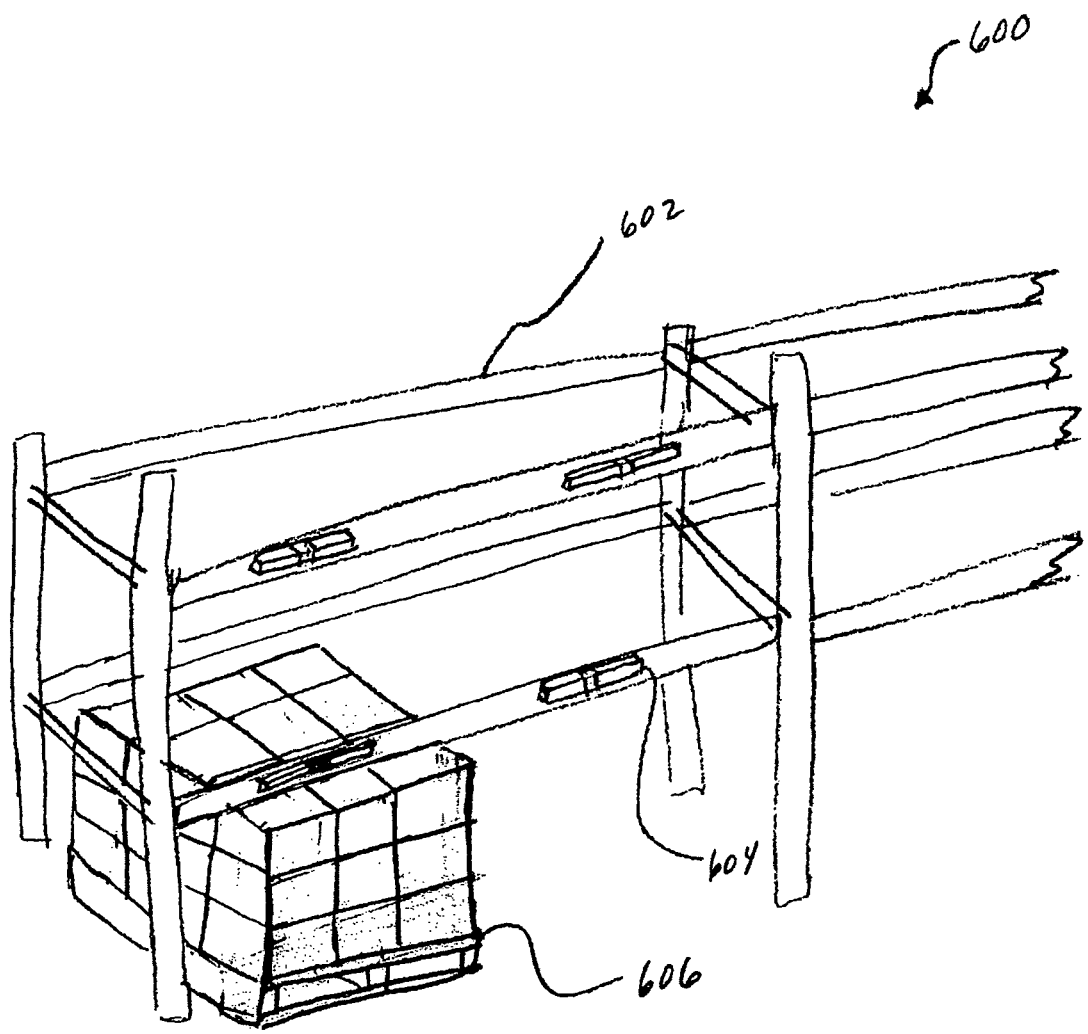
FIG. 6 illustrates a pallet rack with RFID devices according to a certain embodiment of the present invention.

FIG. 6 illustrates a pallet rack 600 according to an embodiment of the present invention. A structure 602 includes one or more RFID tags 604 of the present invention. These tags 604 can be permanently affixed to structure 602 and store location information associated with structure 602 or a particular position within structure 602 (e.g., pallet position). Structure 602 can be any structure suitable for storing pallets, including conventional pallet racks typically found in warehouses. In another embodiment, a metal pallet rack can incorporate one or more tags or, alternatively, one or more slot antennas into its support structure. That is to say, this pallet rack can be fabricated with appropriate cutouts that serve as slot antennas (such as in the front facing portions of one or more shelves of the pallet rack).

Tags 604 of pallet rack 600 can also act as fiducial tags. Fiducial tags are fixed tags that may be used to identify a current location of an RFID reader. Location management systems employing fiducial tags are described in U.S. patent application Ser. No. 11/040,551, entitled "Location Management for Radio Frequency for Radio Frequency Identification Readers," which is incorporated by reference herein.

Figure 7:
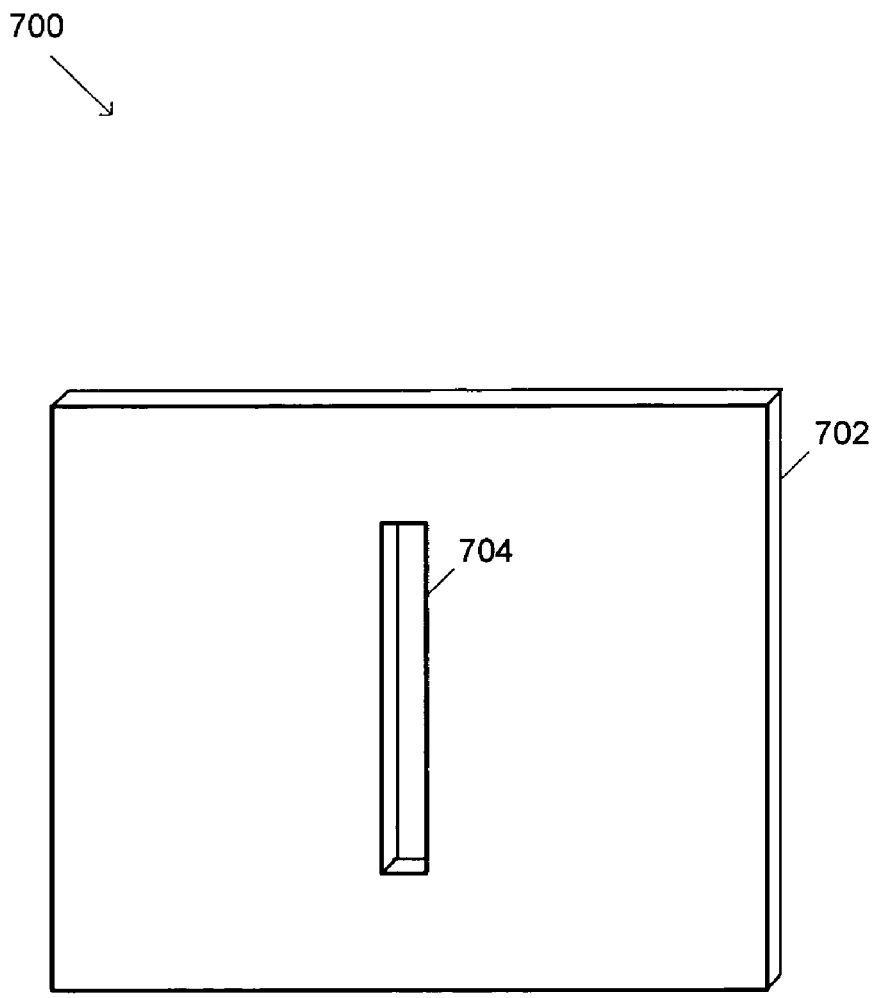
FIG. 7 illustrates an exemplary slot antenna that can be used with an RFID reader according to an embodiment of the present invention.

FIG. 7 illustrates an exemplary RFID reader antenna 700 according to an embodiment of the present invention. Reader antenna 700 is a slot antenna comprising a substrate 702 and a slot 704. It is configured to receive a radio signal within a predetermined frequency range (e.g., about 860 MHz to about 960 MHz). Reader antenna 700 is electrically coupled to a transceiver; it may also be physically coupled to the transceiver. If constructed from conductive materials with suitable mechanical properties, reader antenna 700 will be durable and can also be used to protect the transceiver and/or any processor of the reader.

In a certain embodiment, reader antenna 700 is attached to a forklift. Tags (e.g., item tags, pallet tags, and pallet rack tags) can be conveniently read whenever the forklift moves a pallet. Although the reader antenna can be attached to a forklift in any arbitrary location, it is preferably attached between masts of the forklift. In this way, it is less likely to be damaged and/or it can improve RF performance. In some embodiments, a slot antenna (or a reader with a slot antenna) can be integrated into the forklift's body or frame.

Figure 8:
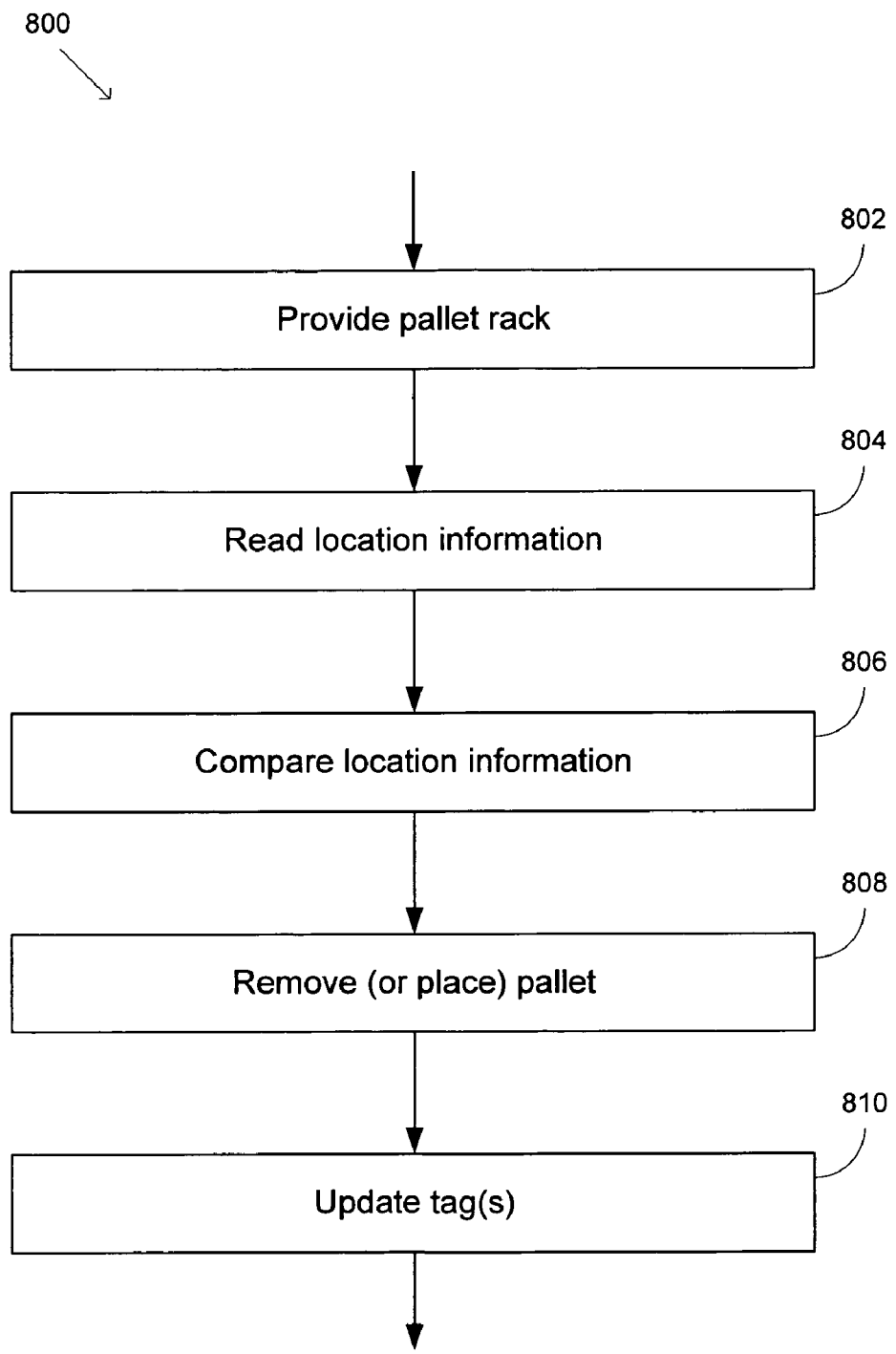
FIG. 8 illustrates a flow chart representation of a method for storing pallets according to one embodiment of the present invention

FIG. 8 illustrates, as a flow chart, an exemplary method 800 for storing and managing pallets according to at least one embodiment of the present invention. In block 802, a pallet rack with at least one RFID tag is provided. The RFID tags store location information. Location information can include, among other things, a unique identifier for the pallet rack, position within the pallet rack, location of the pallet rack relative to a fixed location in space, or data from a global positioning system (GPS), or the like. In an alternative embodiment, a plurality of tags can be coupled to the pallet rack. Each of the plurality of tags can be associated with a specific position within the pallet rack. For example, a pallet rack can be subdivided in smaller sections (e.g., 2, 3, 4, 5, or more sections), with each section associated with at least one tag with a unique identifier.

In block 804, the location information is read. In one embodiment of the present invention, location information is read by an RFID reader mounted, or otherwise attached or integrated, to a forklift (or, alternatively, a pallet jack, platform truck, or hand truck, etc.). This reader may include a slot antenna 700 of FIG. 7 as described above. Location information is then compared to a predetermined location in block 806. This comparison can be performed by the reader's processor or, alternatively, by a separate inventory management system communicating with the reader through various means such as wireless connections.

As shown in block 808 of FIG. 8, if the location information identifies the predetermined location, then a certain operation is performed. For example, a pallet is removed from, or placed in, the pallet rack. This would generally be accomplished by a forklift (or pallet jack, platform truck, hand truck and the like). As used herein, a pallet is any portable platform that can be used for handling, storing, or moving materials and packages. Pallets can be made from any suitable material, including wood, paper, plastic, and/or metal, and may also have a pallet tag associated with it. This pallet tag can include a metal slot antenna according to embodiments of the present invention as described above, in particular with reference to FIGS. 2-5.

In block 810, the reader can optionally update one or more of the RFID tags to reflect the removal, or placement, of the pallet. In fact, this tag can be used to store a running inventory of pallets and/or items stored in the pallet rack in certain embodiments of the present invention. The reader may also update a pallet tag or any item tag on the pallet to store location information. For optimized stock management, location and inventory information can be relayed to an inventory management system for further processing (e.g., via communication network).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency identification (REID) device comprising:
   a slot antenna the slot antenna comprising:
      a substantially planar first substrate; and
      at least one slot disposed in the first substrate, the at least one slot having a predetermined length in a first direction; and
   a strap disposed in a second direction across the slot, the second direction differing from the first direction, the strap including:
      a second substrate;
      an integrated circuit; and
      at least two conductive feedlines, the at least two conductive feedlines electrically coupling the integrated circuit to the slot antenna.

2. The REID device of claim 1 wherein the REID device is associated with a fixed location.

3. The REID device of claim 2 wherein the strap further comprises a memory, the memory storing location information.

4. The REID device of claim 1 wherein the first direction is substantially orthogonal to the second direction.

5. The REID device of claim 1 wherein the at least two feedlines couple to the first substrate on opposite sides of the slot.

6. The REID device of claim 1 wherein the first substrate is conductive.

7. The REID device of claim 1 wherein the first substrate comprises at least one of stainless steel, steel, aluminum, copper, brass, bronze, titanium, iron, and conducting ceramics.

8. The REID device of claim 1 wherein a thickness of the first substrate is at least about ¼ inches.

9. The REID device of claim 1 wherein the predetermined length ranges from about 2 inches to about 4 inches.

10. The REID device of claim 1 wherein the slot antenna is configured to receive radio frequency signals ranging from about 860 MHz to about 960 MHz.

11. The RFID device of claim 1 wherein the predetermined length is at least about 20% of a wavelength of an interrogator signal.

12. The REID device of claim 1 wherein the at least one slot is at least one of a rectangle, polygon, and an elongated oval.

13. The REID device of claim 1 wherein the second substrate is coupled to the first substrate by at least one of a spot weld, solder, and adhesive.

14. The REID device of claim 1 wherein an angle between the first direction and the second direction ranges from about 30 degrees to about 150 degrees.

15. The REID device of claim 1 wherein the strap further comprises an antenna, the antenna electrically coupled to both the first substrate of the slot antenna and the integrated circuit.

16. The REID device of claim 1 wherein the first substrate is a first surface of a container.

17. The REID device of claim 16 wherein the container encloses the strap.

18. The REID device of claim 16 wherein the REID device further comprises a resonator disposed on a second surface of the container.

19. The REID device of claim 1 further configured to be attached to a forklift.

20. The REID device of claim 19 wherein the REID device is configured to be attached between the masts of the forklift.

21. A pallet rack comprising:
    at least one shelf
    at least one radio frequency identification (REID) device associated with the pallet rack, the REID device comprising:
       a first substrate;
       a slot disposed in the first substrate, the slot having a predetermined length in a first direction;
       a second substrate disposed in a second direction across the slot, the first direction differing from the second direction;
       an integrated circuit coupled to the second substrate; and
       at least two contact pads, the at least two contact pads electrically coupling the integrated circuit to the first substrate.

22. The pallet rack of claim 21 wherein the first direction is substantially orthogonal to the second direction.

23. The pallet rack of claim 21 wherein the first substrate is conductive.

24. The pallet rack of claim 23 wherein the first substrate is metal.

25. The pallet rack of claim 23 wherein the first substrate comprises at least one of stainless steel, steel, aluminum, copper, brass, bronze, titanium, iron, and conducting ceramics.

26. The pallet rack of claim 21 wherein a thickness of the first substrate is at least about ¼ inches.

27. The pallet rack of claim 21 wherein the predetermined length ranges from about 2 inches to about 4 inches.

28. The pallet rack of claim 21 wherein the slot is at least one of a rectangle, polygon, and elongated oval.

29. The pallet rack of claim 21 wherein the first substrate and slot are configured to receive radio frequency signals ranging from about 860 MHz to 960 MHz.

30. The pallet rack of claim 21 further comprising a dipole antenna, the dipole antenna coupled to first substrate and the integrated circuit.

31. The pallet rack of claim 21 wherein the first substrate is a surface of a container.

32. The pallet rack of claim 31 wherein the slot extends over at least two sides of the container.

33. The pallet rack of claim 21 wherein the first substrate is part of a support structure of the pallet rack.

34. The pallet rack of claim 21 wherein the REID device stores at least one of (a) location information of the pallet rack, or (b) position information within the pallet rack.

35. The pallet rack of claim 21 wherein the REID device is a fiducial tag.

36. The pallet rack of claim 21 wherein the at least two contact pads are attached to the first substrate at about edges of the slot.

* * * * *

UNITED STATES PATENT AND TRADEMARK OFFICE
CERTIFICATE OF CORRECTION

PATENT NO. : 7,619,531 B2
APPLICATION NO. : 11/489149
DATED : November 17, 2009
INVENTOR(S) : Carrender et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Twenty-sixth Day of October, 2010

David J. Kappos
*Director of the United States Patent and Trademark Office*